(12) United States Patent
Newton et al.

(10) Patent No.: US 10,021,377 B2
(45) Date of Patent: Jul. 10, 2018

(54) COMBINING 3D VIDEO AND AUXILIARY DATA THAT IS PROVIDED WHEN NOT REVEIVED

(75) Inventors: Philip Steven Newton, Eindhoven (NL); Dennis Daniel Robert Jozef Bolio, Eindhoven (NL); Mark Jozef Maria Kurvers, Eindhoven (NL); Gerardus Wilhelmus Theodorus Van Der Heijden, Eindhoven (NL); Wilhelmus Hendrikus Alfonsus Bruls, Eindhoven (NL); Wiebe De Haan, Eindhoven (NL); Johan Cornelis Talstra, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 536 days.

(21) Appl. No.: 13/386,493

(22) PCT Filed: Jul. 20, 2010

(86) PCT No.: PCT/IB2010/053302
§ 371 (c)(1),
(2), (4) Date: Jan. 23, 2012

(87) PCT Pub. No.: WO2011/013030
PCT Pub. Date: Feb. 3, 2011

(65) Prior Publication Data
US 2012/0120200 A1    May 17, 2012

(30) Foreign Application Priority Data
Jul. 27, 2009 (EP) .................................. 09166465
Dec. 17, 2009 (EP) .................................. 09179557

(51) Int. Cl.
H04N 13/04 (2006.01)
H04N 13/00 (2018.01)
H04N 19/597 (2014.01)

(52) U.S. Cl.
CPC ..... H04N 13/0454 (2013.01); H04N 13/0003 (2013.01); H04N 13/007 (2013.01);
(Continued)

(58) Field of Classification Search
CPC ........... H04N 13/0048; H04N 13/0066; H04N 13/007; H04N 13/0425; H04N 13/0003;
(Continued)

(56) References Cited

U.S. PATENT DOCUMENTS 4,520,816 A * 6/1985 Schachar ............. A61B 3/0075
219/121.76
4,792,829 A * 12/1988 Firmani ................. G03B 27/72
355/38
(Continued)

FOREIGN PATENT DOCUMENTS

EP    0905988 A1    3/1999
EP    1599053 A2    11/2005
(Continued)

OTHER PUBLICATIONS

Fehn, Christoph "Depth-Image-Based Rendering (DIBR), Compression and Transmission for a New Approach on 3D-TV", SPIE vol. 5291, 2004, pp. 93-104.
(Continued)

Primary Examiner — Jay Patel
Assistant Examiner — Joseph Suh

(57) ABSTRACT

A three dimensional [3D] video signal (41) is provided for transferring to a 3D destination device (50). Depth metadata is determined indicative of depths occurring in the 3D video data, which depth metadata includes a near value indicative
(Continued)

of depths of video data nearest to a user. The 3D video signal, which comprises the 3D video data, now also includes the depth metadata. The 3D destination device (50) is enabled to retrieve the depth metadata, to provide auxiliary data, and to position the auxiliary data at an auxiliary depth in dependence of the retrieved metadata for displaying the auxiliary data in combination with the 3D video data such that obscuring the auxiliary data by said nearest video data, and/or disturbing effects at the boundary of the auxiliary data, is avoided.

29 Claims, 8 Drawing Sheets

(52) U.S. Cl.
CPC ..... *H04N 13/0048* (2013.01); *H04N 13/0059* (2013.01); *H04N 13/0066* (2013.01); *H04N 13/0425* (2013.01); *H04N 19/597* (2014.11)

(58) Field of Classification Search
CPC ........... H04N 13/0059; H04N 13/0454; H04N 13/00769; H04N 19/597
USPC ......................................................... 348/46
See application file for complete search history.

(56) References Cited

U.S. PATENT DOCUMENTS

| | | | | |
|---|---|---|---|---|
| 5,440,680 | A * | 8/1995 | Ichikawa | G09G 5/14 345/536 |
| 5,673,081 | A * | 9/1997 | Yamashita | H04N 13/026 348/42 |
| 5,973,722 | A * | 10/1999 | Wakai | H04H 20/62 725/106 |
| 6,005,607 | A | 12/1999 | Uomori | |
| 6,104,837 | A * | 8/2000 | Walker | G06T 15/10 345/421 |
| 6,163,337 | A * | 12/2000 | Azuma | G06T 7/0022 348/43 |
| 6,373,485 | B2 * | 4/2002 | Sowizral | 345/421 |
| 7,139,767 | B1 * | 11/2006 | Taylor | G06F 17/30244 |
| 7,450,120 | B1 * | 11/2008 | Hakura | G06T 15/005 345/421 |
| 8,182,870 | B1 * | 5/2012 | Khounsary | C23C 16/00 427/248.1 |
| 9,037,599 | B1 * | 5/2015 | Bailly | G06F 17/30241 382/285 |
| 2002/0075275 | A1 * | 6/2002 | Togo | A63F 13/10 345/582 |
| 2003/0169369 | A1 * | 9/2003 | Kahn | H04N 5/44513 348/468 |
| 2003/0179198 | A1 * | 9/2003 | Uchiyama | H04N 13/0404 345/427 |
| 2004/0032980 | A1 * | 2/2004 | Harman | G06T 7/0022 382/154 |
| 2005/0034157 | A1 * | 2/2005 | Seo | H04N 5/4401 725/59 |
| 2005/0259147 | A1 * | 11/2005 | Nam | H04N 13/0029 348/43 |
| 2006/0082575 | A1 * | 4/2006 | Auberger | G06T 7/0065 345/421 |
| 2006/0156228 | A1 * | 7/2006 | Gallo | G06F 3/0481 715/202 |
| 2007/0008840 | A1 | 1/2007 | Martens et al. | |
| 2007/0248260 | A1 | 10/2007 | Pockett | |
| 2008/0007567 | A1 * | 1/2008 | Clatworthy | G06Q 30/02 345/619 |
| 2008/0043095 | A1 * | 2/2008 | Vetro | H04N 13/0011 348/51 |
| 2008/0082497 | A1 * | 4/2008 | Leblang | G06F 17/30864 |
| 2008/0177994 | A1 * | 7/2008 | Mayer | 713/2 |
| 2009/0096863 | A1 * | 4/2009 | Kim | G06K 9/00604 348/42 |
| 2009/0122134 | A1 | 5/2009 | Joung et al. | |
| 2009/0142041 | A1 * | 6/2009 | Nagasawa | H04N 13/0033 386/341 |
| 2009/0317061 | A1 * | 12/2009 | Jung | H04N 13/0003 386/248 |
| 2010/0021141 | A1 * | 1/2010 | Yamashita | H04N 5/775 386/356 |
| 2010/0067864 | A1 * | 3/2010 | De Waele | G06T 7/0051 386/278 |
| 2010/0091012 | A1 | 4/2010 | Newton et al. | |
| 2010/0091097 | A1 * | 4/2010 | Pockett | H04N 13/0018 348/54 |
| 2010/0118119 | A1 * | 5/2010 | Newton | H04N 13/007 348/42 |
| 2010/0142924 | A1 * | 6/2010 | Yamashita | G11B 27/10 386/241 |
| 2010/0158351 | A1 | 6/2010 | De Jong et al. | |
| 2010/0165077 | A1 * | 7/2010 | Yin | H04N 19/597 348/42 |
| 2010/0188572 | A1 * | 7/2010 | Card, II | H04N 5/445 348/468 |
| 2010/0251101 | A1 * | 9/2010 | Haussecker | H04N 5/23238 715/243 |
| 2010/0253680 | A1 * | 10/2010 | Kobayashi | H04N 13/0048 345/419 |
| 2010/0328428 | A1 * | 12/2010 | Booth, Jr. | G06T 15/30 348/46 |
| 2011/0045891 | A1 * | 2/2011 | Ansari | G07F 17/32 463/20 |
| 2011/0074924 | A1 * | 3/2011 | Barenbrug | H04N 13/0029 348/43 |
| 2011/0122131 | A1 * | 5/2011 | Bruls | H04N 13/0022 345/419 |
| 2011/0128351 | A1 * | 6/2011 | Newton | H04N 5/278 348/43 |
| 2011/0242104 | A1 * | 10/2011 | Zhang | H04N 13/0003 345/419 |

FOREIGN PATENT DOCUMENTS

| | | |
|---|---|---|
| JP | 9009300 A | 1/1997 |
| JP | 09121370 A | 5/1997 |
| WO | 2008038205 A2 | 4/2008 |
| WO | 2008053417 A1 | 5/2008 |
| WO | 2008115222 A1 | 9/2008 |
| WO | 2008139351 A1 | 11/2008 |

OTHER PUBLICATIONS

Konrad, Janusz et al "Dense Disparity Estimation from Feature Correspondences" IS&T/SPIE Symposium on Electronic Imaging Stereoscopic Displays and Virtual Realithy System. Jan. 23-28, 2000, San Jose, CA, pp. 1-12.

* cited by examiner

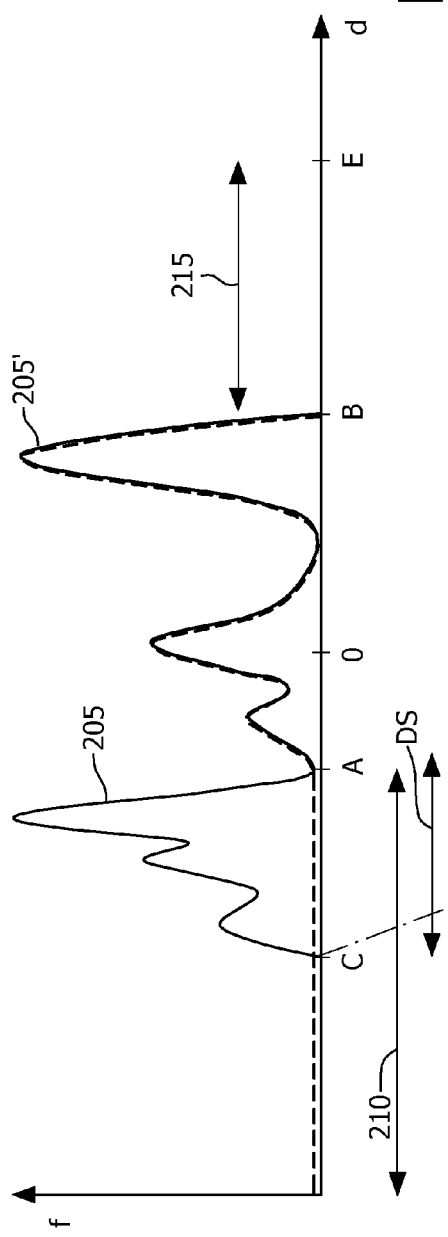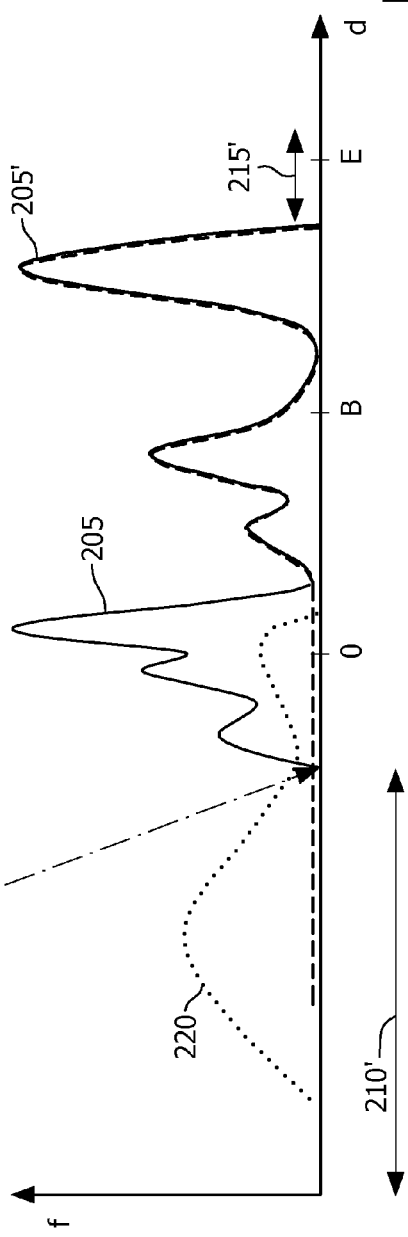

| Syntax | No. of bits |
|---|---|
| Disparity/depth_metadata() { | |
| reserved_for_future_use | 8 |
| number_of_display_pictures_in_GOP | 8 |
| for(i=0; i <number_of_display_pictures_in_GOP; i++) { | |
| //presentation order | |
| reserved_for_future_use | |
| Video_max_disparity | 8 |
| Video_min_disparity | 8 |
| Order fields ..1 | |
| Order fields ..n | |
| } | |
| } | |

| Syntax |
|---|
| EP_map(){ |
| Etc. |
| Entry point reference value |
| PTS of the entry point |
| File location of the entry point |
| *Metadata associated to the entry point* |
| *{* |
| *Metadata_type* |
| *Metadata payload* |
| *}* |
| Etc. } |

| Syntax | No. of bits |
|---|---|
| depth_map (){ | |
| Depth_max | 8 |
| Depth offset | 8 |
| etc. } | |

| Syntax | No. of bits |
|---|---|
| disparity_map (){ | |
| disparity_max | 8 |
| disparity_min | 8 |
| etc. } | |

COMBINING 3D VIDEO AND AUXILIARY DATA THAT IS PROVIDED WHEN NOT REVEIVED

FIELD OF THE INVENTION

The invention relates to a method of providing a three dimensional [3D] video signal for transferring to a 3D destination device, the method comprising determining depth metadata indicative of depths occurring in the 3D video data, which depth metadata includes a near value indicative of depths of video data nearest to a user.

The invention further relates to a 3D source device, a 3D destination device, a signal, a record carrier and a computer program product.

The invention relates to the field of rendering 3D video data in combination with auxiliary data such as subtitles, logos, or further 3D image data, on a 3D display device.

BACKGROUND OF THE INVENTION

Devices for generating 2D video data are known, for example video servers, broadcasters, or authoring devices. Currently 3D enhanced devices for providing three dimensional (3D) image data are being proposed. Similarly destination devices for rendering display 3D video data are being proposed, like players for optical disc (e.g. Blu-ray Disc; BD) or set top boxes which render received digital video signals. The destination device is to be coupled to a display device like a TV set or monitor. Video data is transferred from the source device via a suitable interface, preferably a high-speed digital interface like HDMI. The 3D display may also be integrated with the destination device, e.g. a television (TV) having a receiving section and a 3D display.

For 3D content, such as 3D movies or TV broadcasts, additional, auxiliary data may be displayed in combination with the image data, for example subtitles, a logo, a game score, a ticker tape for financial news or other announcements or news.

The document WO2008/115222 describes a system for combining text with three dimensional content. The system inserts text at the same level as the nearest depth value in the 3D content. One example of 3D content is a two-dimensional image and an associated depth map. In this case, the depth value of the inserted text is adjusted to match the nearest depth value of the given depth map. Another example of 3D content is a plurality of two-dimensional images and associated depth maps. In this case, the depth value of the inserted text is continuously adjusted to match the nearest depth value of a given depth map. A further example of 3D content is stereoscopic content having a right eye view and a left eye view. In this case the text in one of the left eye view and right eye view is shifted to match the nearest disparity value in the stereoscopic image. Yet another example of 3D content is stereoscopic content having a plurality of right eye views and left eye views. In this case the text in the left eye views or right eye views is continuously shifted to match the nearest depth value in the stereoscopic images. As a result, the system produces text combined with 3D content wherein the text does not obstruct the 3D effects in the 3D content and does not create visual fatigue when viewed by a viewer.

SUMMARY OF THE INVENTION

The document WO2008/115222 describes that the auxiliary graphical data is to be displayed in front of the closest part of the image data. A problem occurs when auxiliary data needs to be combined with 3D video data in a destination device which has limited processing resources. Deriving the nearest depth value from a 3D video stream requires processing the depth information. In particular for a multi view 3D video stream, e.g. including a left and right view, detecting the nearest depth, or the disparity value corresponding thereto, requires substantial processing.

It is an object of the invention to provide a system for combining the auxiliary data and 3D video content in a more convenient way.

For this purpose, according to a first aspect of the invention, the method as described in the opening paragraph comprises
generating the 3D video signal comprising the 3D video data, and
including the depth metadata in the 3D video signal for enabling the 3D destination device
to retrieve the depth metadata,
to provide auxiliary data, and
to position the auxiliary data at an auxiliary depth in dependence of the retrieved metadata for displaying the auxiliary data in combination with the 3D video data.

For this purpose, according to a second aspect of the invention, the 3D source device for providing a three dimensional [3D] video signal for transferring to a 3D destination device, comprises processing means for
determining depth metadata indicative of depths occurring in the 3D video data, which depth metadata includes a near value indicative of depths of video data nearest to a user,
generating the 3D video signal comprising the 3D video data, and
including the depth metadata in the 3D video signal for enabling the 3D destination device
to retrieve the depth metadata,
to provide auxiliary data, and
to position the auxiliary data at an auxiliary depth in dependence of the retrieved metadata for displaying the auxiliary data in combination with the 3D video data.

For this purpose, according to a further aspect of the invention, the 3D destination device for receiving a three dimensional [3D] video signal, comprises receiving means for receiving the 3D video signal comprising the 3D video data and depth metadata indicative of depths occurring in the 3D video data, which depth metadata includes a near value indicative of depths of video data nearest to a user, and processing means for
retrieving the depth metadata from the 3D video signal, providing auxiliary data, and
positioning the auxiliary data at an auxiliary depth in dependence of the retrieved metadata for displaying the auxiliary data in combination with the 3D video data.

For this purpose, according to a further aspect of the invention, a three dimensional [3D] video signal for transferring 3D video data to a 3D destination device, comprises the 3D video data and depth metadata indicative of depths occurring in the 3D video data, which depth metadata includes a near value indicative of depths of video data nearest to a user, for enabling the 3D destination device
to retrieve the depth metadata,
to provide auxiliary data, and
to position the auxiliary data at an auxiliary depth in dependence of the retrieved metadata for displaying the auxiliary data in combination with the 3D video data.

The measures have the effect of at the source determining depth values occurring in the 3D video data, e.g. calculating disparity values from left and right view in a left/right 3D format, or processing the depth data from a 2D+depth stream, or deriving such depth values from any other 3D image format. The depth metadata is subsequently included in the 3D video signal. Advantageously, at the destination device, any auxiliary data may be combined with the 3D video data, and positioned in the depth direction based on the depth metadata such that obscuring the auxiliary data by said nearest video data, and/or disturbing effects at the boundary of the auxiliary data, are avoided. It is noted that such disturbing effects would occur when auxiliary data is positioned farther away than a closer object but still would be displayed. In particular, the auxiliary data is not required to be available at the source device but is dynamically provided at the destination device which generates a combined 3D video signal by positioning the auxiliary data at the appropriate depth without requiring substantial processing resources for deriving the depth metadata.

The invention is also based on the following recognition. The prior art document describes positioning the text at a depth before the closest element in the image at a 3D video source system. However, auxiliary data may not be available at the source. Positioning the auxiliary data at the destination device based on the prior art would require substantial processing. Moreover, for showing dynamic auxiliary data like menus or generated auxiliary graphical objects like game characters a suitable part of the 3D video data can be selected based on the depth metadata, e.g. a period in time having a near value that is not close to the viewer. Such positioning does bring text or objects less close to the viewer. Finally the system allows the author of the 3D video to set the depth metadata and affect the positioning of any auxiliary data added at the rendering device.

In an embodiment the depth metadata comprises a far value indicative of depths occurring in the 3D video data farthest away from the user for enabling the 3D destination device to set the auxiliary depth farther away from the user than the near value, and to apply a shift to the 3D video data in the direction away from the user for shifting said nearest video data to a depth farther away from the user than the auxiliary depth, the shift being maximized based on the far value. The effect is that the three dimensional video signal is adapted by shifting the input three dimensional video signal backwards (away from the viewer) by means of a shift in the depth direction based on the far value. Hence a range of depth is made free for positioning the auxiliary data in the depth direction in front of the shifted three dimensional video.

In an embodiment the near value is a disparity value. The effect is that the destination device is aware of the disparity value of the nearest video data, and can easily position auxiliary data before the video by using the disparity value. In an embodiment of the destination device, when the auxiliary data is two dimensional [2D] data and the near value is a disparity value, the processing means are arranged for generating at least a left auxiliary image and a right auxiliary image by applying, to the 2D auxiliary data, at least one horizontal shift based on the disparity value. Advantageously may be directly used to generate a right view by shifting a left view, or shifting the view by 50% of the disparity to the left and right to generate a left and right view.

In an embodiment the 3D video signal comprises an encoded video data stream arranged for conveying decoding information according to a predefined standard, and said including the depth metadata in the 3D video signal comprises including the depth metadata in at least one of:
a user data message;
a signaling elementary stream information [SEI] message;
an entry point table;
an XML based description.

The effect is that the additional depth metadata is included by extending control messages or parameters according to the predefined standard. Advantageously the enhanced, encoded video stream is compatible to the existing predefined standard, while effective transferring the depth metadata.

Further preferred embodiments of the method, 3D devices and signal according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which FIG. 2A illustrates a disparity histogram of a three dimensional input signal, FIG. 2B illustrates a further disparity histogram of a three dimensional input signal and a three dimensional overlay.

FIG. 9 shows a data structure for depth metadata in a 3D video signal on a record carrier, FIG. 10a shows the format of the metadata field carrying depth metadata, and FIG. 10b shows the format of the metadata field carrying disparity data.

In the Figures, elements which correspond to elements already described have the same reference numerals.

DETAILED DESCRIPTION OF EMBODIMENTS

It is noted that the current invention may be used for any type of 3D display that has a depth range. Video data for the 3D displays is assumed to be available as electronic, usually digital, data. The current invention relates to such image data and manipulates the image data in the digital domain.

There are many different ways in which 3D images may be formatted and transferred, called a 3D video format. Some formats are based on using a 2D channel to also carry the stereo information. For example the left and right view can be interlaced or can be placed side by side and above and under. These methods sacrifice resolution to carry the stereo information. Another option is to sacrifice color, this approach is called anaglyphic stereo. Anaglyphic stereo uses spectral multiplexing which is based on displaying two separate, overlaid images in complementary colors. By using glasses with colored filters each eye only sees the image of the same color as of the filter in front of that eye. So for example the right eye only sees the red image and the left eye only the green image.

A different 3D format is based on two views using a 2D image and an additional depth image, a so called depth map, which conveys information about the depth of objects in the 2D image. The format called image+depth is different in that it is a combination of a 2D image with a so called "depth", or disparity map. This is a gray scale image, whereby the gray scale value of a pixel indicates the amount of disparity (or depth in case of a depth map) for the corresponding pixel in the associated 2D image. The display device uses the disparity, depth or parallax map to calculate the additional views taking the 2D image as input. This may be done in a variety of ways, in the simplest form it is a matter of shifting pixels to the left or right dependent on the disparity value associated to those 30 pixels. The paper entitled "Depth image based rendering, compression and transmission for a new approach on 3D TV" by Christoph Fehn gives an excellent overview of the technology.

Figure 1:
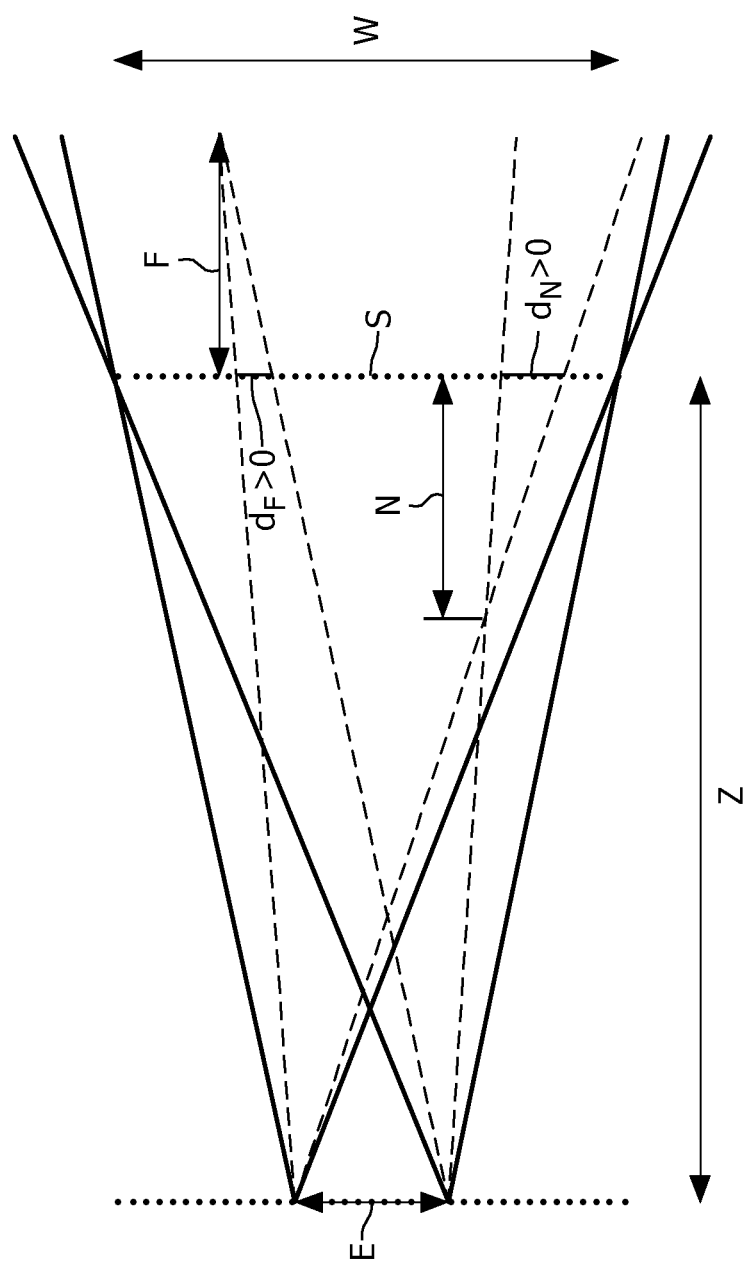
FIG. 1 illustrates several general concepts and parameters defining disparity.

FIG. 1 illustrates several general concepts and parameters defining disparity. FIG. 1 shows two viewpoints located at the edges of the double arrow E, spaced apart by eye-distance E. At a viewing distance Z, a screen S, represented by a dotted line, is located which is used for displaying three dimensional information. Such a screen in practice may be e.g. a time or spectrum sequential display that alternatively provides an eye of an observer wearing appropriate eye-wear with appropriate image information for the respective view point. The screen S here is placed at zero disparity, and W indicates the width of the screen. N (near) represents the maximum perceived depth in front of the screen S. Likewise F (far) represents the maximum perceived depth behind the screen S.

The line $d_N$ represents the perceived disparity of an object located at N in front of the screen S, the disparity value $d_N$ here is negative, also referred to as crossed disparity and can be expressed as:

$$d_N = NE/(Z-N) \quad [1]$$

The line $d_F$ represents the perceived disparity of an object located at F behind the screen S, the disparity value $d_F$ here is positive, also referred to as un-crossed disparity, and can be expressed as:

$$d_F = FE/(Z+F) \quad [2]$$

In practice the maximum disparity should be below the eye distance E to allow comfortable viewing. In practice the maximum disparity is preferably set to a value below the average eye distance E to allow for variation in eye distance between people.

It is noted that the maximum positive screen parallax, that is the number of pixels corresponding to the maximum positive disparity depends on the screen width W and resolution of the screen S.

FIG. 2A illustrates a disparity histogram 205 of a three dimensional input signal. The histogram 205 is determined based on the input three dimensional signal, i.e. on the entire spatial area of the three dimensional input signal. Alternatively a disparity histogram may be compiled for representative samples of the entire spatial area of the three dimensional input signal.

In FIG. 2A the nearest disparity value along the d-axis is point C, having a negative disparity. The farthest disparity value is point B along the d-axis having a positive disparity.

Based on the histogram 205 the far disparity estimate for use in a method in accordance with the present invention corresponds to point B.

The histogram 205 indicates that there is headroom 215 available within the disparity range to shift the disparity range of the input three dimensional away from the viewer that is moving the histogram to the right.

Consider the situation wherein an overlay needs to be placed within a particular spatial region in the respective views. FIG. 2A also shows a disparity histogram for the input three dimensional signal in the relevant spatial region. The histogram of the three dimensional input signal for the spatial region is indicated by the thick broken line 205'. Based on the histogram 205' the near disparity estimate indicative of the smallest disparity value for this spatial region corresponds to point A. Note that as this particular spatial region does not comprise smaller (i.e. more negative) disparity values, there is already substantial headroom 210 in the spatial region for placement of an overlay.

Note that the spatial region for placement of an overlay is typically a block or segment defined by an outline, and as such is clearly different from sample points that are used to determine a disparity estimate for the view in its entirety as described hereinabove.

Although there is already substantial headroom in the spatial region for placement of an overlay, it is possible to create even more headroom by shifting the disparity range of the input three dimensional video signal away from the viewer by a disparity shift DS, wherein DS<E-B. Although not strictly necessary, it is advisable to preserve a margin (E-B)—DS as indicated in FIG. 2B by margin 215' for accommodating different eye-distances between various users. As a result the present invention provides an additional gain in the disparity range for placement of the overlay.

The histogram 220 indicates the disparity histogram of the overlay, as the overlay is placed entirely within this spatial region this histogram also is the histogram of the overlay over the entire image. As a result of the disparity shift, it is now possible to place overlay information such as subtitles at or near the zero disparity plane which improves overlay viewing comfort.

As indicated above the far and near disparity estimate may be determined based on disparity histogram information provided with the input three dimensional video signal. Alternatively the far and near disparity estimate may be derived from the input three dimensional video signal using algorithms known to those skilled in the art. An example of such an algorithm is presented in "Dense disparity estimation from feature correspondences" by Konrad, et al, IS&T/SPIE Symposium on Electronic Imaging Stereoscopic Displays and Virtual Reality Syst., Jan. 23-28, 2000, San Jose, Calif., USA.

Figure 3:
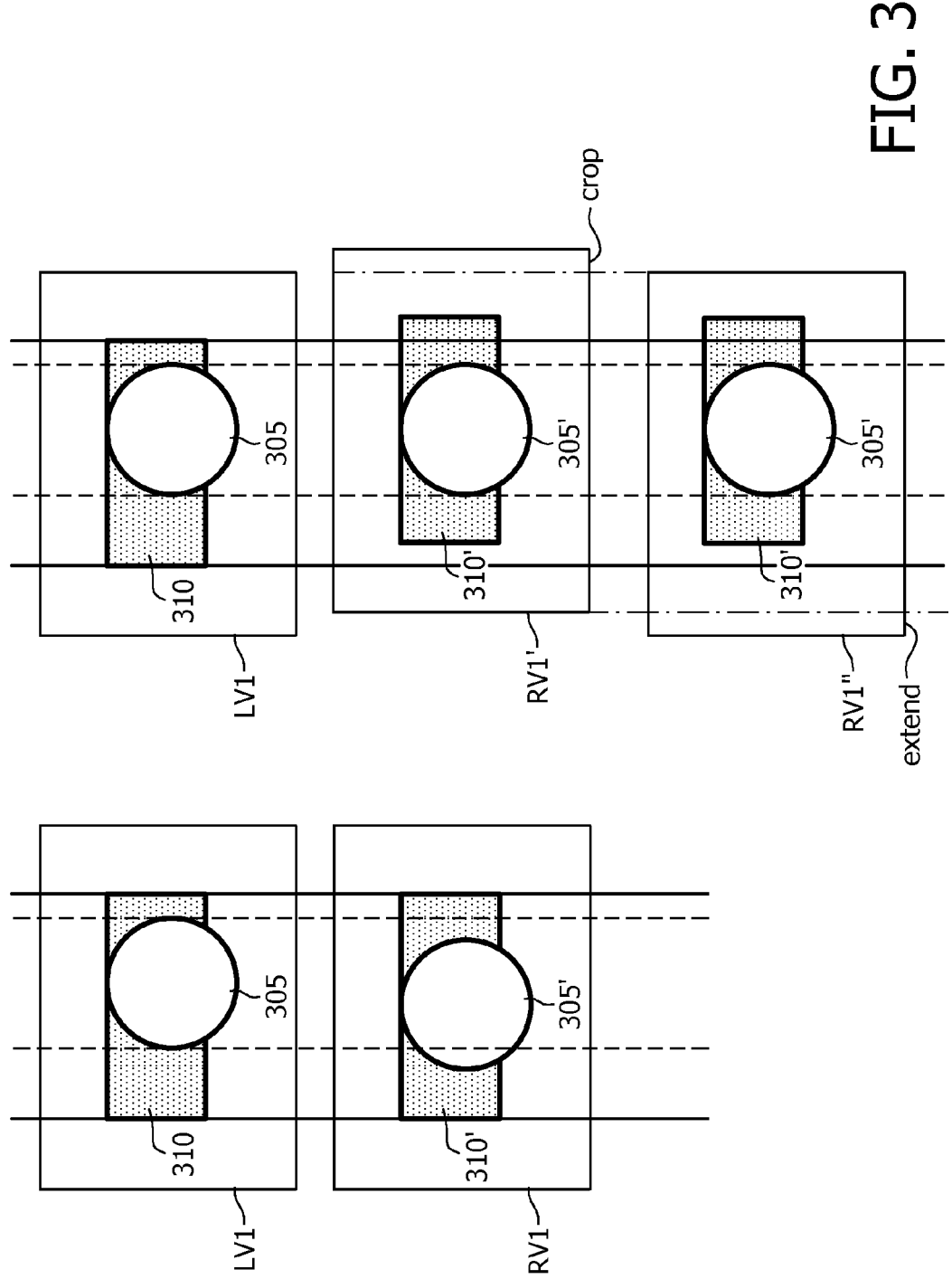
FIG. 3 illustrates the adaptation of a right view image of a stereo input pair in accordance with the present invention.

FIG. 3 illustrates the process of shifting the disparity as proposed by the present invention. On the left hand side are shown an image pair LV1 and RV1 from a stereo input video signal. The images show a gray block 310 and 310' placed at zero disparity and a white disc 305 and 305' placed in front of the block at negative disparity in respectively the images LV1 and RV1.

As can be seen from the finely dashed vertical lines at the edges of the gray block 310 and 310', the rectangle has zero disparity because it is placed at the same position in the left and right image.

The disc 305 and 305' has a negative screen parallax, i.e. in the right image RV1 the disc 305' is to the left of the position of the disc 305 in the left image LV1. As a result it is visualized in front of the display.

In order to shift the scene backwards we shift RV1 to the right to obtain RV1'. Comparing RV1' to LV1 we now see that the disc 305' has zero disparity and the rectangle has positive disparity.

In order to fit the shifted image to a stereo display the shifted image RV1' is cropped on the right hand side and extended by an equal amount on the left hand side to arrive at RV1". LV1 and RV1" in turn can be visualized together as a new stereo pair in which the scene has been shifted to the back compared to the original LV1-RV1 pair. As a result the pair LV1-RV1" has more headroom for placement of an overlay than the pair LV1-RV1.

It should be noted that although in the above example only one of the views is shifted, it is also possible to shift both the left image LV1 and the right image RV1 by an equal opposing amount, wherein the combined amount corresponds to the shift of RV1'. As a result both shifted images will have to be extended, but the extension region is half the size of that cropped and extended in FIG. 3. As a result artifacts resulting from the extending may be spread more evenly.

When shifting multi-view content, e.g. three views, it is possible to preserve the center image and to shift and extend the left and right image respectively. It will be clear to the skilled person that the above manner of shifting of the disparity range can subsequently be extended to further multi-view images and to any appropriate amounts of shift of the images resulting in the same relative amount of shift between them.

When adapting the input three dimensional video signal several options are available, for example, a first option is to use cropping only. Consider a stereo video signal, in this case it is possible to crop both the left and right images in the video signal by an equal amount. In case the image aspect ratio is not an issue the cropped views do not require extension and could be used as is. The advantage of doing so is that as no extension is needed, no extension artifacts are introduced. A second option is to use cropping and extension as described hereinabove. Consider a stereo video signal, in this case it is possible to crop both the left and right images in the video signal by an equal amount and subsequently extend the respective views as presented in FIG. 3. The advantage of using extension is that the aspect ratio of the input three dimensional video signal may be preserved. It is noted that the above list of options is not exhaustive.

Figure 4:
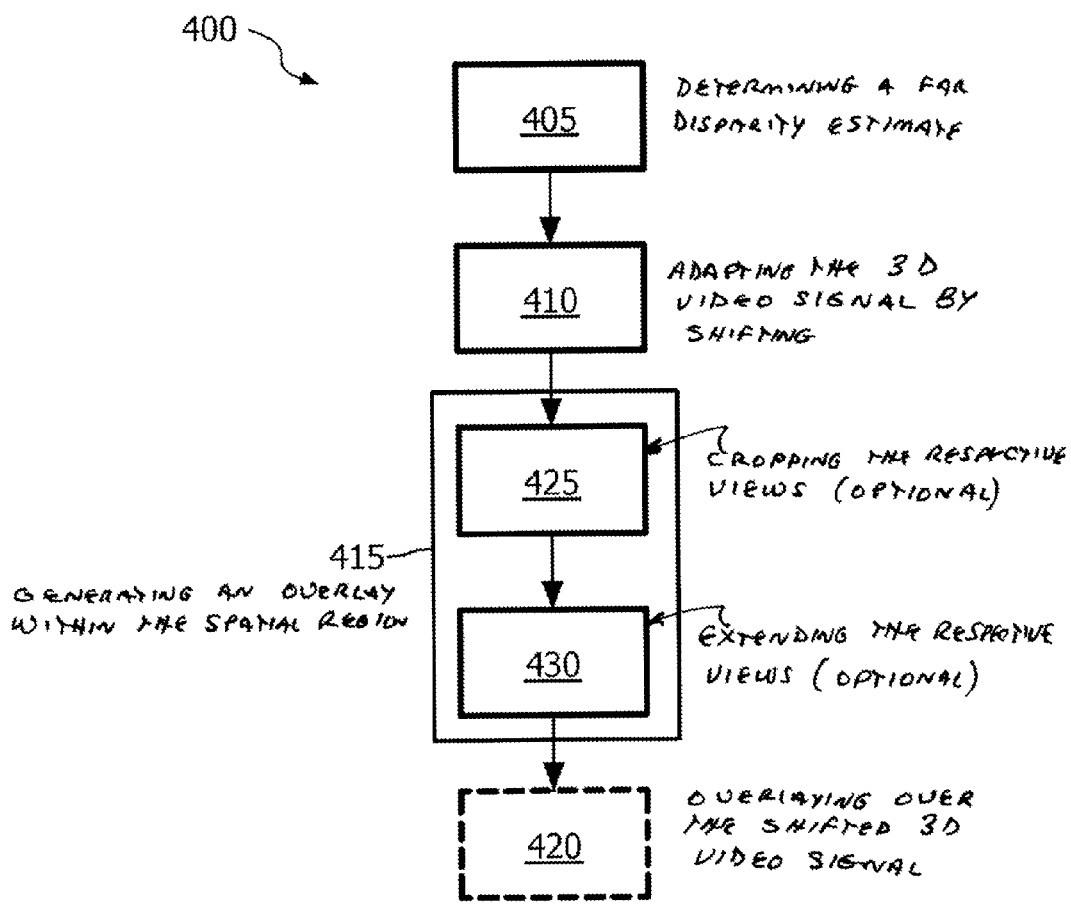
FIG. 4 illustrates a method according to the present invention.

FIG. 4 presents a flowchart of a method 400 according to the present invention for processing an input three dimensional video signal comprising multiple views. The method comprises a step for determining 405 a far disparity estimate indicative of the largest disparity value for the input three dimensional video signal and a near disparity estimate indicative of the smallest disparity value for a spatial region within the input three dimensional video signal. As indicated above the respective disparity estimates may be based on metadata or can alternatively determined based on the image content of the input three dimensional video signal.

The method further comprises a step of adapting 410 the three dimensional video signal by shifting the input three dimensional video signal backwards by means of a disparity shift based on the far disparity estimate and generating 415 an overlay within the spatial region for the shifted three dimensional video signal based on the near disparity estimate and the disparity shift.

Preferably the method further comprises a step of overlaying 420 the overlay over the shifted three dimensional video signal.

As indicated hereinabove the step of adapting the input three dimensional video signal may comprise a step for cropping 425 and extending 430 the respective views with padding pixels so as to obtain an altered disparity range.

In case of a stereo signal, one or preferably both views are cropped and subsequently extended. For an N-view multi-view image, with N even, N−1 or preferably N-views are cropped and extended as described hereinabove.

Figure 5A:
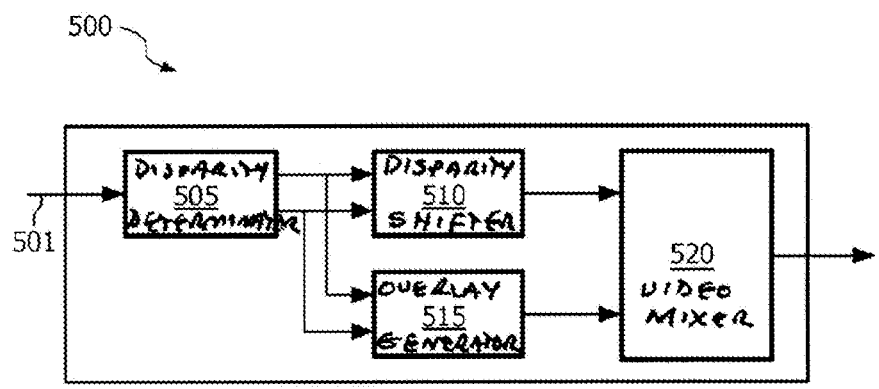
FIG. 5A illustrates a system according to the present invention and FIG. 5B illustrates a further system according to the present invention.

FIG. 5A presents a system 500 according to the present invention for processing an input three dimensional video signal comprising multiple views. The system 500 comprises a disparity determinator 505 for determining a far disparity estimate indicative of the largest disparity value for the input three dimensional video signal and a near disparity estimate indicative of the smallest disparity value for a spatial region within the input three dimensional video signal. As indicated hereinabove, the disparity determinator 505 may be implemented as a disparity estimator. The system further comprises a disparity shifter 510 arranged for adapting the three dimensional video signal by shifting the three dimensional video signal backwards by means of a disparity shift based on the far disparity estimate. The system 500 further comprises an overlay generator 515 arranged to generate an overlay within an overlay safe area for the shifted three dimensional video signal based on the near disparity estimate and the disparity shift.

Preferably the system 500 also comprises a video mixer 520 arranged to overlay the overlay over the shifted three dimensional video signal. The system 500 as shown in FIG. 5A may be implemented on a Personal Computer or other computing platform for off-line processing of content. Alternatively it may be implemented in e.g. a Blu-ray disc playback capable device, or a Set Top Box or a 3D-TV.

Figure 5B:
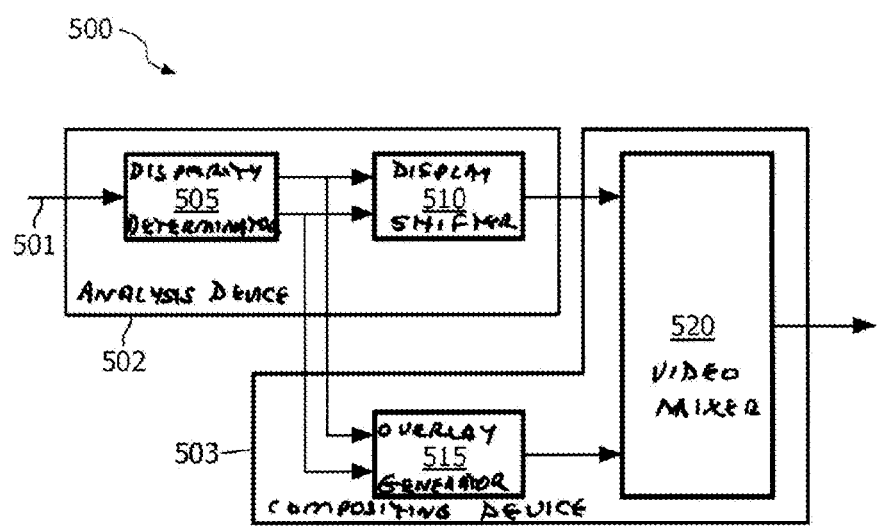

FIG. 5B shows a further system 500 according to the present invention wherein the system is partitioned in an analysis device 502 and a compositing device 503, both devices combined implement the functionality found in the system 500 as presented in FIG. 5A.

It is noted that the far and near disparity estimate may be determined for example by using coarse grain disparity analysis of the input three dimensional video signal as described above, or alternatively, by using meta-data provided in the input three dimensional video signal.

In an embodiment, depth and/or parallax of subtitles is supplied as meta-data with the video either per frame or per group of frames. The producer of the film or post-production people can produce these meta data by an authoring tool. The depth and/or parallax of subtitles is used to position the subtitles at the corresponding depth or parallax in front of the background video.

Providing depth meta-data in a 3D video signal is elucidated now in detail. It is noted that depth metadata is any data describing a property of the depth information in the 3D video signal. For the system described here at least a near value is included in the depth metadata, which is indicative of depths of video data nearest to a user, i.e. elements in the 3D video closest to the viewer when properly displayed on a 3D display. The above described near disparity estimate, and said depth and/or parallax of subtitles, are examples of the near value.

Figure 6:
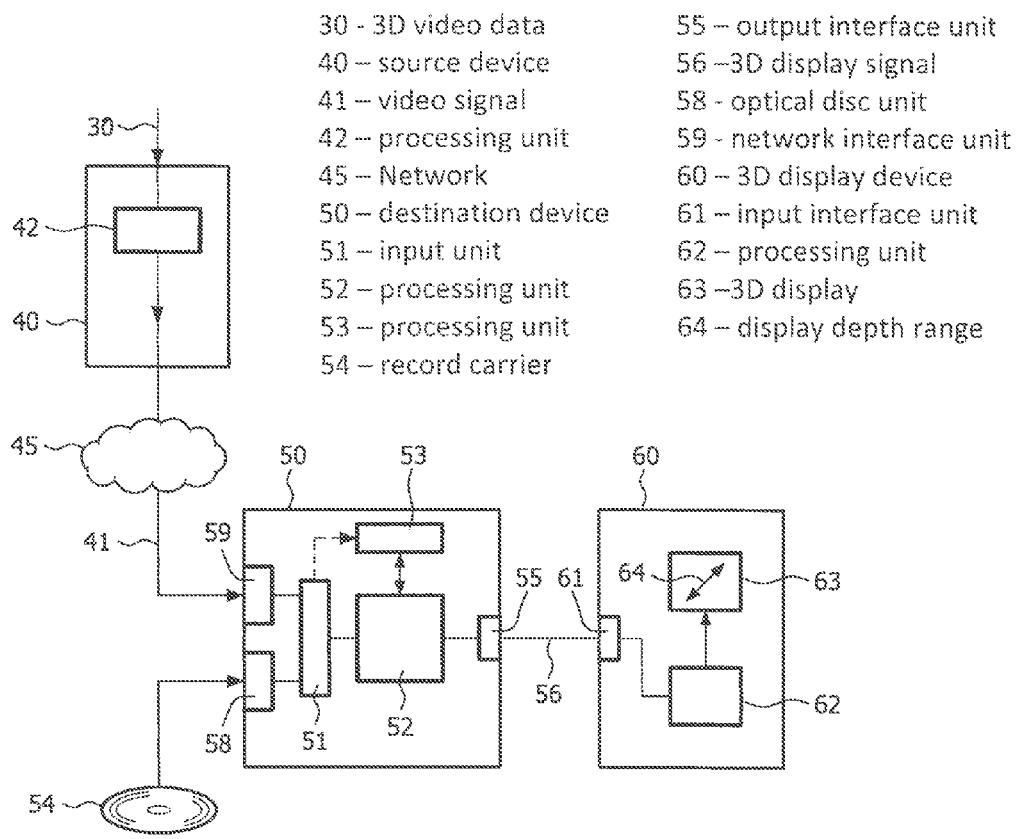
FIG. 6 shows a system for displaying 3D image data.

FIG. 6 shows a system for displaying three dimensional (3D) image data, such as video, graphics or other visual information. A 3D source device 40 transfers a 3D video signal 41 to a destination device 50, which is coupled to a 3D display device 60 for transferring a 3D display signal 56. The 3D destination device has an input unit 51 for receiving the 3D video signal. For example the device may include an optical disc unit 58 coupled to the input unit for retrieving the 3D video information from an optical record carrier 54 like a DVD or Blu-ray disc. Alternatively, the device may include a network interface unit 59 for coupling to a network 45, for example the internet or a broadcast network, such destination device usually being called a set-top box. The 3D video signal may be retrieved from a remote media server, e.g. the source device 40. The destination device may also be a satellite receiver, or a media player.

The 3D source device has a processing unit 42 for determining depth metadata indicative of depths occurring in 3D video data 30. The 3D video data may be available from storage, from 3D camera's, etc. The depth metadata includes a near value indicative of depths of video data nearest to a user, i.e. elements in the 3D video closest to the viewer when properly displayed on a 3D display. Determining depth metadata such as disparity values, and examples of the near value, have been discussed above for multi view data (e.g. the near disparity estimate (A) indicative of the smallest disparity value for a spatial region within the input three dimensional video signal). The processing unit generates the 3D video signal comprising the 3D video data, and includes the depth metadata in the 3D video signal.

The 3D source device may be a server, a broadcaster, a recording device, or an authoring and/or production system for manufacturing record carriers like the Blu-ray Disc. Blu-ray Disc supports an interactive platform for content creators. It supports two layers of graphics overlay and two sets of programmable environment for the author to choose from. For 3D stereoscopic video there are many formats. The major formats are stereo and the image-plus-depth format. Of these again there are many possible ways in which the content can be formatted to be suitable for use with new and existing 3D displays and distribution formats. This also has an impact on how to extend the graphics systems in the Blu-ray Disc standard to make them suitable to be used in combination with a particular format of the 3D video. More information on the Blu-ray Disc format is available from the website of the Bluray Disc association in a paper on the audio-visual application format 2b bdrom_audiovisualapplication 030 5-12955-15269.pdf. Hence auxiliary data may be included to be added at various stages of the rendering. The production process further comprises the steps of deriving the physical pattern of marks in the tracks which embodies the 3D video signal including the depth metadata, and subsequently shaping the material of the record carrier to provide the tracks of marks on at least one storage layer.

The 3D destination device has a processing unit 52 coupled to the input unit
51 for processing the 3D information for generating a 3D display signal 56 to be transferred via an output interface unit 55 to the display device, e.g. a display signal according to the HDMI standard, see "High Definition Multimedia Interface; Specification Version 1.3a of Nov. 10 2006". The processing unit 52 is arranged for generating the image data included in the 3D display signal 56 for display on the display device 60.

The destination device has an auxiliary processing unit 53 for providing auxiliary data to be combined with the 3D video data on the 3D display. Auxiliary data may be any additional graphical image data that is to be combined locally, i.e. in the destination device, with 3D video content, such as subtitles, a logo of a broadcaster, a menu or system message, error codes, news flashes, ticker tape, a further 3D stream such as a commentary, etc. In the text below usually subtitle will be used as indicative for every type of auxiliary data.

The 3D display device 60 is for displaying 3D image data. The device has an input interface unit 61 for receiving the 3D display signal 56 including the 3D video data and the auxiliary data transferred from the destination device 50. The transferred 3D video data is processed in processing unit 62 for displaying on a 3D display 63, for example a dual or lenticular LCD. The display device 60 may be any type of stereoscopic display, also called 3D display, and has a display depth range indicated by arrow 64.

Alternatively the processing for providing and positioning the auxiliary data is performed in an embodiment of the display device. The 3D video data, and optional auxiliary data, are transferred via the display signal 56. The auxiliary data may also be locally generated in the display device, e.g. a menu. The processing unit 62 now performs the functions of combining the auxiliary data with the 3D video data on the 3D display. The processing means 62 may be arranged for the corresponding functions as described below for the processing means 52,53 in the destination device. In a further embodiment the destination device and the display device are integrated in a single device, where a single set of processing means performs said functions.

FIG. 6 further shows the record carrier 54 as a carrier of the 3D video signal. The record carrier is disc-shaped and has a track and a central hole. The track, constituted by a series of physically detectable marks, is arranged in accordance with a spiral or concentric pattern of turns constituting substantially parallel tracks on an information layer. The record carrier may be optically readable, called an optical disc, e.g. a CD, DVD or BD (Blue-ray Disc). The information is represented on the information layer by the optically detectable marks along the track, e.g. pits and lands. The track structure also comprises position information, e.g. headers and addresses, for indication the location of units of information, usually called information blocks. The record carrier 54 carries information representing digitally encoded image data like video, for example encoded according to the MPEG2 or MPEG4 encoding system, in a predefined recording format like the DVD or BD format.

The processing means 52,53 in the destination device are arranged for executing the following functions. The 3D video signal is received by the receiving means 51,58,59. The 3D video signal comprises the 3D video data and depth metadata indicative of depths occurring in the 3D video data, which depth metadata includes a near value indicative of depths of video data nearest to a user as described above. The processing means 52,53 are arranged for retrieving the depth metadata from the 3D video signal, providing auxiliary data, and positioning the auxiliary data at an auxiliary depth in dependence of the retrieved metadata for displaying the auxiliary data in combination with the 3D video data such that obscuring the auxiliary data by said nearest video data is avoided.

A problem with overlaying 3D graphics over 3D video is related to how to position the graphics overlay in 3D space without knowing in the playback device the Z ranges of the stereoscopic 3D video in the background. This is typically the case for stereoscopic 3D video in stereo format. The way in which this can be solved depends highly on the format of the 3D video that is used and on how the combined video and graphics is sent to a 3D display device.

Using metadata to composite 3D images may be based on a complete 3D model including geometry, lighting and such to allow proper compositing of stereoscopic images. This approach provides a mechanism to composite 3D images in an authoring environment in the post production stage. The problem however with a full 3D model is that this requires a lot of data as 3D information is provided for every pixel in the image. Such an approach is less feasible when dealing with stereoscopic images generated in real-time that must be composited on stereoscopic video in a consumer device such as a Blu-ray Disc player or a settop box.

It is now proposed to provide depth metadata for the 3D video data which are background to dynamic auxiliary data, such that e.g. graphics that are generated in real-time can be composited onto this video background.

In an embodiment for every frame or Group of Pictures (GOP) depth metadata is added to the 3D video signal. This depth metadata may include a single byte of data whereby the value indicates the nearest disparity between the left and right view of the stereoscopic video background. Alternatively this depth metadata value may indicate the disparity of any graphics overlay such that if the player composites real-time generated graphics that it should position the graphics at the disparity as indicated in the metadata.

The proposed depth metadata may consist of one byte per frame or per GOP. If a byte is added to every frame then for a two-hour stereoscopic movie this requires 173 KB of data, this is reasonable. Usage per Group of Pictures would reduce this to (for a 1 second Gop length) 7.2 KB of data. Because of the limited size the depth metadata could be extended to include further 3D related fields.

A further problem to be solved is how to include the depth metadata in the distribution format in such a way that it can be included in a compatible way and that it allows the player to actually be able to use it for real-time compositing. Several ways of including the metadata are described now.

The destination device is to be equipped with a so called "Z" compositor which can overlay stereoscopic graphics on stereoscopic video. For example the "Z" compositor is included in the processing unit 52. The "Z" compositor interprets the depth metadata and from this determines the positioning of the auxiliary data on top of the video in the 3D space.

In an embodiment the "Z" compositor is a simplified version of a full 3D model based "Z" compositor as mentioned in the prior art. The version does not require a full geometric model of both the video and the graphics, but only uses one byte that indicates the depth or disparity range of the stereoscopic video and uses this for the overlay of auxiliary data.

As to storing the metadata in one embodiment the depth metadata for the video background is included in a user data message according to a predefined standard transmission format such as MPEG4, e.g. a signaling elementary stream information [SEI] message of a H.264 encoded stream. The method has the advantage that it is compatible with all systems that rely on the H.264/AVC coding standard (see e.g. ITU-T H.264 and ISO/IEC MPEG-4 AVC, i.e. ISO/IEC 14496-10 standards). New encoders/decoders could implement the new SEI message whilst existing ones would simply ignore them.

Figures 7, 8:
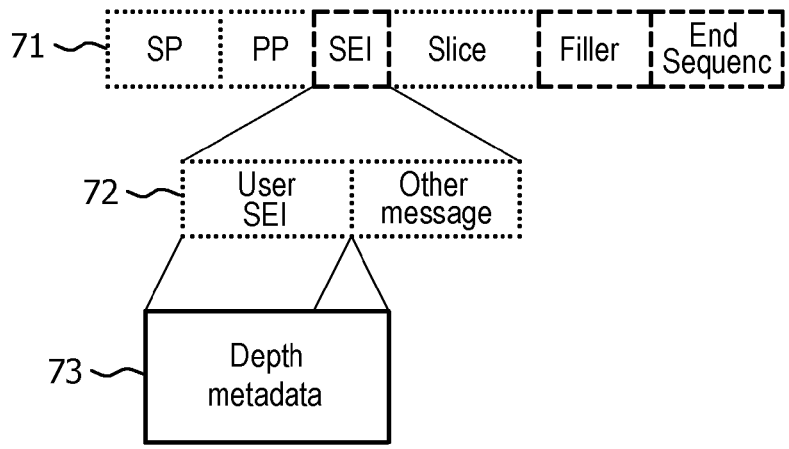
FIG. 7 shows disparity/depth metadata in a private user data SEI message.
FIG. 8 shows a data structure for depth metadata in a 3D video signal.

FIG. 7 shows depth metadata in a private user data SEI message. An 3D video stream 71 is schematically indicated. One element in the stream is the signaling to indicate the parameters of the stream to the decoder, the so called signaling elementary stream information [SEI] message 72. More specifically the depth metadata 73 could be stored in a user data container. The depth metadata may include depth values, disparity values or any other representation of depth information.

FIG. 8 shows a data structure for depth metadata in a 3D video signal. The table shown in the Figure defines the syntax of the respective control data packets in the video stream, in particular a GOP_structure_map( ). The data structure defines fields for depth metadata 81, i.e. Video-_max_disparity which defines the far value, and the Video-_min_disparity which defines the near value; also see FIG. 1 for defining disparity values. Note that the video min disparity field indicates the nearest object in 3D space towards the viewer and may be used to determine where the overlay any graphics such as subtitles whilst the video max disparity indicates the disparity of an object in the video that is the furthest away from the viewer. It is noted that some documents in the public domain define the maximum disparity value to represent the nearest object; for such definition the sign of the disparity values is to be reversed. At screen depth the disparity is zero irrespective of said definition.

FIG. 9 shows a data structure for depth metadata in a 3D video signal on a record carrier. For video data on a record carrier like Blu-ray Disc an entry point map may be provided that indicates entry points that allow rendering of the video starting at the entry point. The entry point map data structure may be extended by adding depth metadata, which defines the depth values for the fragment of 3D video data starting at the entry point, and, for example, valid until the next entry point. Specific for the Blu-ray Disc standard the metadata is stored in an EP-map as shown in the Figure. The EP map comprises a table that holds entries to all the valid decoding access points in a stream, i.e. the points where decoding may start.

Alternatively the metadata is provided as a XML based description, this description is transported in the data carousel of a MPEG-2 transport stream. An interactive TV application transmitted also in this MPEG-transport stream can make use of this XML based description to determine how to composite stereoscopic graphics onto the video. Alternative the metadata may be provided as an extension to the playlist.

In a further improvement the metadata is extended to include minimum and maximum disparity ranges. This would allow overlay of multiple planes of video and graphics.

In a further improvement intended for overlay of text such as subtitles the playback device stores the maximum value of the disparity ranges of the depth metadata in a special purpose register. It then uses the nearest value to determine at what depth (or disparity) to overlay the subtitles. The value held in this register changes only gradually over time. This ensures that the subtitles do not constantly change in depth as this can cause eye-strain in the spectator.

A further extension of the depth metadata is to define several regions in the video frame and to assign depth metadata values specifically to that region. In an embodiment selecting a region is performed as follows. The display area is subdivided in multiple regions. Detecting the depth metadata is performed for each region. For example the frame area is divided into 2 or more regions (e.g. are horizontal stripes) and for each region the min and max depth is added to stream. This gives for freedom for the graphics overlay since it can now be positioned depending also on the region.

The region depth metadata may be based on spatially filtering the depth values of the multiple regions according to a spatial filter function in dependence of the region. In an example the display area is divided in tiles. In each tile the maximum depth is computed separately. In the example, the auxiliary data can be at a specific depth even if the depth of another object in a different region is significantly closer to the viewer. This also allows subtitles to be composited on a different area and disparity than for example a pop-up menu. The "Z" compositor and the amount of data that is stored are extended to accommodate the handing of regions.

In an alternative embodiment for storing the metadata, the SEI messages per GOP contains a list of disparity or offset values and a disparity or offset direction indicator for the output planes. The disparity or offset value indicates the pixel shift between the left—and right output plane of the stereoscopic output and the direction indicator indicates whether the pixel shift is to the left—or to the right. A pixel shift is when a corresponding pixel in the left output plane at location x is shifted to x+n or x−n in the right output plane. This list of offset values may be used for various purposes. Generally such offset values are used for overlay of 2D single view graphics on top of a stereoscopic video background. In such a case the offset value; n is used to shift the pixels in the 2D image to create a second image for overlay over the second view ("R") of the stereoscopic video background whereas the 2D image is overlaid over the first view ("L") of the stereoscopic video background. The inventors have realised that such a list of offset values with direction indicator may also be used to represent the maximum—and/or minimum disparity of the video background. For example a plane offset value=x with a plane offset direction indicating a shift to the left of the pixels in the second ("R") plane indicates the video_max_disparity and a plane offset value=y with a plane offset direction indicator indicating a shift to the right of the pixels in the second ("R") plane indicates the video_min_disparity. What is proposed is that additional signalling is included in the table that lists the playable streams out of which the playback device can select during a presentation. The additional signalling indicates which of the embedded offset values in the list, embedded in the SEI messages of the dependent stream, should be used to signal the max—and/or min disparity of the stereoscopic image on the output. FIG. 11 shows an example of such signalling. FIG. 11

```
other fields ..1
other fields ..n
for (primary_video_stream_id=0;
    primary_video_stream_id<
    number_of_primary_video_stream_entries[pi_id];
    primary_video_stream_id ++) {
    MVC_Dependent_view_video_stream_entry( ) {
        other fields ..1
        other fields ..n
        video max_disparity_offset_sequence_id    8   uimsbf
        video min_disparity_offset_sequence_id    8   uimsbf
    }
}
other fields ..1
other fields ..n
```

A system using the depth metadata requires creating the metadata and distributing the data, and finally a so called "Z" compositor to read the metadata and composite the auxiliary data over the 3D video, e.g. stereoscopic graphics over the stereoscopic video. A disparity estimator and metadata encoder determines the minimum and/or maximum disparity of a frame in the video content and encodes this in the distribution channel. For Blu-ray Disc this may either be in the EP-map or in SEI messages directly in the coded stream, as described above.

The EP map is typically used during trickplay, it allows the player to jump quickly to the right location in the stream to start decoding the next frame. We extend this table with depth metadata. FIG. 9 shows a simplified version of this table, extended with a metadata field that carries any metadata associated to the access point.

FIG. 10a shows the format of the metadata field carrying depth metadata. There are two fields 92 one containing the maximum depth range value of the access point and another optional field that is used to carry the offset. For a correct overlay the depth of the graphics should be nearer than the depth_max value.

FIG. 10b shows the format of the metadata field carrying disparity data. The disparity data 93 is an alternative version of depth metadata that provides minimum and maximum disparity ranges or values, this allows overlay of multiple planes of video. A system to apply the invention requires means to create the metadata, to distribute the data and, at the destination, a so called "Z" compositor to read the metadata and composite the stereoscopic graphics over the stereoscopic video.

The video data processing at the destination device is as follows. For decoding the "Z" compositor determines the frame where the graphics is to be overlaid. It then reads the "depth" or disparity metadata of that frame or if that is not available it uses the value associated with the nearest I-frame (or entry-point). In the next step it determines whether the disparity between the left and right the graphics image is larger (i.e. has a more negative value) or equal to the disparity of the video background images. If the disparity of the stereoscopic graphics is larger or equal to the value indicated in the video metadata, then the Z-compositor just composites the left and right graphics images on to the left and right video frames. If the disparity is smaller then the auxiliary data is farther away and the "Z" compositor adjusts the disparity of the stereoscopic graphics images by performing a linear shift to match the disparity of the graphics with the value indicated in the depth metadata.

Alternatively when only mono graphics is available the "Z" compositor composites the graphics on the Left video frame and composites the graphics on the right video frame, but shifted horizontally to the right. The amount of shift depends on the value of the "depth" or disparity metadata. Note that the shift required to obtain the desired parallax depends on some parameters such as the viewing distance of the spectator to the display. When calculating a shift as a number of pixels the width and resolution of the spectators display must be known. These parameters may also be included as an option into the "depth" metadata. In an embodiment a standardized or reference set-up is used where for example the display has a width of 1 meter and the spectator is sitting 4 meters from the display.

In a practical embodiment subtitles are overlaid on 3D content. The primary content exists as stereo (left/right) images; the subtitles also exist as images. The embodiment can as well render the subtitles from a suitable description. The embodiment is using the following steps:

For the respective period of the 3D video the disparity is retrieved from the metadata transferred with the 3D video signal. Within the region and/or period of interest the nearest disparities are retrieved from the metadata. Filtering may be applied to the list of minimum disparities to determine a filtered disparity.

The auxiliary data is positioned at the filtered disparity, e.g. subtitles are blended on top of the left and right images using a pixel displacement between left and right that is equal to the filtered disparity.

If subtitles are pre-rendered, regular alpha blending is used. If the subtitles exist in textual format, they are rendered with sub-pixel precision.

A small offset (usually one pixel) can be applied to generate a small depth range between the front most object and the subtitles.

It is noted that the above method enables selecting the target region by selecting a region of the image data where no depth values occur larger than the auxiliary depth values. Moreover, said selecting may include selecting a period in time for displaying the auxiliary data such that, in the target region, no depth values occur larger than the auxiliary depth values. For example, the rendering of the subtitle may be delayed or shifted to allow a more forward object to disappear.

In an embodiment determining the depth pattern includes detecting depth values in multiple frames of video content, and temporally filtering the depth values according to a temporal filter function. For example a period of time may be considered in which the subtitle itself is to be displayed, or a period slightly longer to avoid objects appearing substantially adjacent to, and more forward than, the subtitle. The period of displaying the subtitle is usually indicated in the display signal.

In particular determining the depth pattern may include setting a time window for the temporal filter function based on detecting shot boundaries in the multiple frames of video content. This can be implemented as follows.

From the left or right images the shot boundaries are computed. The start images of shots are found by detecting large changes in the image content, using the color histogram of the image. The minimum disparity list is detected for the shots according to the shot cuts detected before. For each shot the minimum disparity list is then filtered with a suitable time window function (example see below). A window function is a function that is zero-valued outside of some chosen interval. For instance, a function that is constant inside the interval and zero elsewhere is called a rectangular window, which describes the shape of its graphical representation. The image signal (data) is multiplied by the window function, and the product is also zero-valued outside the interval.

Filtering each shot separately guarantees that only values from within the shot are used. Thus the depth values of the auxiliary graphical data are allowed to jump at shot cuts if the disparity of the front most object within the region of interest jumps, but it is not allowed to jump within a shot. As an alternative also the depth placement between shots can be filtered allowing for smooth transitions at shot boundaries.

For choosing the window function the embodiment uses a Hann window function but other window functions, e.g. a rectangular window function, are also suitable. The Hann function, named after the Austrian meteorologist Julius von Hann, is a discrete probability mass function given by $$w(n) = 0.5\left(1 - \cos\left(\frac{2\pi n}{N-1}\right)\right)$$

The window is centered at the current position in time, so that both values of the past and future are taken into account. This has the effect of smoothing the values, thus avoiding abrupt changes in the disparity, and of making sure that the overlay is always in front of the 3D content. Future values may not be available, e.g. for real time broadcasts, and windowing may be based on past values only. Alternatively a part of the future frames may be stored in a buffer first while applying a small delay in rendering.

It is noted that including the far value, i.e. the minimum parallax shift [PS] or maximum disparity of the video allows to push back the video (decrease the PS or increase the disparity for L+R with the same value) in order to make room for the auxiliary data. The far value is taken into account to avoid excessive push back, i.e. the push back should never result in disparity values above the eye-to-eye distance (usually 6 cm) on the screen, i.e. beyond infinity. By including the far value (e.g. the maximum disparity) this can be prevented by the player. The player should also know the screen size to calculate the corresponding shift in pixels.

In an embodiment of the destination device it is detected if the maximum value is such that there is no room to (sufficiently) shift the video backwards. The processing then temporarily switches to a special mode, in which the main 3D video is displayed as mono video or to mono video with one selected depth having a left and right view shifted such that the mono appears behind the screen. An additional parameter in the stream (e.g. one byte for a period of the 3D video) may indicate the appropriate depth (or disparity) to put the mono video at a selected depth, e.g. somewhat behind the screen, while the auxiliary video is displayed closer, e.g. at the screen.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method of providing a three dimensional video signal for transferring to a three dimensional display device, wherein the three dimensional display device comprises a three dimensional display that has a first surface, wherein the first surface emits light, the method comprising:
in a source device:
determining depth metadata indicative of depths of elements occurring in a three dimensional video data, wherein the depth metadata is distinct from the video data and includes a near value indicative of a depth of one or more elements occurring in the three dimensional video data that extend most in a first direction normal to the first surface and away from the first surface toward a viewer when displayed on the three dimensional display,
generating the three dimensional video signal comprising the three dimensional video data, and
including the depth metadata in the three dimensional video signal; and
in the three dimensional display device:
receiving the three dimensional video signal from the source device,
retrieving the three dimensional video data and the depth metadata from the three dimensional video signal, and
positioning at least one auxiliary data object at an auxiliary depth based on the retrieved metadata, wherein the auxiliary data object is displayed in combination with the three dimensional video data.

2. The method as claimed in claim 1, wherein the depth metadata comprises a far value indicative of a depth of one or more elements occurring in the three dimensional video data that extend least in the first direction for enabling the three dimensional display device to set the auxiliary depth farther away from the viewer than the near value, and to apply a shift to the three dimensional video data in a second direction normal to the first surface and away from the viewer to shift the three dimensional video data to a depth farther away from the viewer than the auxiliary depth, wherein the shift is dependent upon the far value.

3. The method of claim 2, wherein the shift is a disparity shift based on a predetermined maximum disparity value between adjacent views of multiple views in the three dimensional video data, the predetermined maximum disparity value being dependent on at least one of: a selected eye distance value; a safety margin (M); and a user defined maximum disparity value.

4. The method as claimed in claim 1, wherein the near value is a disparity value.

5. The method as claimed in claim 1, wherein the three dimensional video signal comprises an encoded video data stream arranged for conveying decoding information according to a predefined standard, and said including the depth metadata in the three dimensional video signal comprises including the depth metadata in at least one of: a user data message; a signaling elementary stream information message; an entry point table; and an XML based description.

6. The method as claimed in claim 1, wherein the depth metadata comprises data indicative of depths occurring in a period of the three dimensional video data, the period being one of: a group of pictures, a shot, and a group of shots.

7. The method as claimed in claim 1, wherein the depth metadata comprises data indicative of depths occurring in at least one spatial region of the three dimensional video data.

8. The method as claimed in claim 1, wherein the method comprises manufacturing a record carrier, wherein the record carrier comprises a track of marks representing the three dimensional video signal.

9. The method of claim 1, wherein if auxiliary data is not received from the source device, providing the auxiliary data, wherein the auxiliary data includes at least one of subtitles, logos, or three dimensional image data.

10. The method of claim 1, wherein the depth metadata is a list of offset values and an offset direction indicator, the offset values indicating a pixel shift between a left output plane and a right output plane of the auxiliary data and the direction indicator indicates whether the pixel shift is to the left or to the right.

11. A three dimensional source device for providing a three dimensional video signal for transferring to a three dimensional display device, wherein the three dimensional display device comprises a three dimensional display that has a first surface, wherein the first surface emits light,
the source device comprising an electronic processor circuit that:
determines depth metadata indicative of depths of elements occurring in the three dimensional video data, wherein the depth metadata is distinct from the video data and includes a near value indicative of a depth of one or more elements occurring in the three dimensional video data that extend most in a first direction normal to the first surface and away from the first surface toward a viewer when displayed on the three dimensional display,
generates the three dimensional video signal comprising the three dimensional video data, and
includes the depth metadata in the three dimensional video signal to enable the three dimensional display device to retrieve the depth metadata from the source device, and to position auxiliary data at an auxiliary depth in dependence on the retrieved metadata for displaying the auxiliary data in combination with the three dimensional video data.

12. The three dimensional source device as claimed in claim 11, wherein the depth metadata comprises a far value indicative of a depth of one or more elements occurring in the three dimensional video data that extend least in the first direction.

13. The three dimensional source device as claimed in claim 12, and the electronic processor circuit:
sets the auxiliary depth farther away from the viewer than the near value, applies a shift to the three dimensional video data in the direction away from the viewer for shifting the three dimensional video data to a depth farther away from the viewer than the auxiliary depth, wherein the shift is based on the far value.

14. The three dimensional source device as claimed in claim 13, wherein the electronic processor circuit:
   detects that the far value does not allow a shift for accommodating the auxiliary depth,
   generates at least a left view and a right view by reducing the three dimensional video data to two dimensional video and applying, to the two dimensional video, a horizontal shift based on a disparity value dependence on the near value.

15. The three dimensional source device as claimed in claim 11, wherein the auxiliary data is two dimensional data and the near value is a disparity value, and the electronic processor circuit generates at least a left auxiliary image and a right auxiliary image by applying, to the two dimensional auxiliary data, at least one horizontal shift based on the disparity value.

16. The source device of claim 11, wherein the depth metadata is a list of offset values and an offset direction indicator, the offset values indicating a pixel shift between a left output plane and a right output plane of the auxiliary data and the direction indicator indicates whether the pixel shift is to the left or to the right.

17. A three dimensional display device for receiving a three dimensional video signal, the device comprising:
   a three dimensional display that has a first surface, wherein the first surface emits light,
   an input unit that receives the three dimensional video signal comprising three dimensional video data and depth metadata indicative of depths occurring in the three dimensional video data, which depth metadata is distinct from the video data and includes a near value indicative of a depth of one or more elements occurring in the three dimensional video data that extend most in a first direction normal to the first surface and away from the first surface toward a viewer when displayed on the three dimensional display, and
   an electronic processor circuit that:
      retrieves the three dimensional video data and the depth metadata from the three dimensional video signal, and
      positions at least one auxiliary data object at an auxiliary depth based on the retrieved metadata, wherein the auxiliary data object is displayed in combination with the three dimensional video data,
   wherein the input unit is a portion of the electronic processor circuit.

18. The display device as claimed in claim 17, wherein the input unit is arranged to read the three dimensional video signal from a record carrier.

19. The display device as claimed in claim 17, wherein the depth metadata comprises a far value indicative of a depth of one or more elements occurring in the three dimensional video data that extend least in the first direction, and the electronic processor circuit:
   sets the auxiliary depth farther away from the viewer than the near value, and
   applies a shift to the three dimensional video data in a second direction that is normal to the first surface and away from the viewer to shift the three dimensional video data to a depth farther away from the viewer than the auxiliary depth, wherein the shift is dependent upon the far value.

20. The display device as claimed in claim 19, wherein the electronic processor circuit:
   detects that the far value does not allow a shift for accommodating the auxiliary depth,
   generates at least a left view and a right view by reducing the three dimensional video data to the two dimensional video and applying, to the two dimensional video, a horizontal shift based on a disparity value dependence on the near value.

21. The display device as claimed in claim 17, wherein the auxiliary data is two dimensional data and the near value is a disparity value, and the electronic processor circuit generates at least a left auxiliary image and a right auxiliary image by applying, to the two dimensional auxiliary data, at least one horizontal shift based on the disparity value.

22. The display device of claim 17, wherein if auxiliary data is not received from another device, providing auxiliary data, wherein the auxiliary data includes at least one of subtitles, logos, or three dimensional image data.

23. The display device of claim 17, wherein the depth metadata is a list of offset values and an offset direction indicator, the offset values indicating a pixel shift between a left output plane and a right output plane of the auxiliary data and the direction indicator indicates whether the pixel shift is to the left or to the right.

24. A non-transitory computer readable storage medium comprising a computer program including a set of instructions executable by an electronic processor circuit, for providing a three dimensional video signal for transferring to a three dimensional display device, wherein the three dimensional display device comprises a three dimensional display that has a first surface, wherein the first surface emits light, the medium comprising:
   code for determining depth metadata indicative of depths of elements occurring in a three dimensional video data, which depth metadata is distinct from the video data and includes a near value indicative of a depth of one or more elements occurring in the three dimensional video data that extend most in a first direction normal to the first surface and away from the first surface toward a viewer when displayed on the three dimensional display,
   code for generating the three dimensional video signal comprising the three dimensional video data, and
   code for including the depth metadata in the three dimensional video signal for enabling the three dimensional display device to retrieve the depth metadata, and to position auxiliary data at an auxiliary depth that is based on the retrieved metadata for displaying the auxiliary data in combination with the three dimensional video data.

25. The medium of claim 24, comprising code that provides the auxiliary data if the auxiliary data is not received from another device, wherein the auxiliary data includes at least one of subtitles, logos, or three dimensional image data.

26. The medium of claim 24, wherein the depth metadata is a list of offset values and an offset direction indicator, the offset values indicating a pixel shift between a left output plane and a right output plane of the auxiliary data and the direction indicator indicates whether the pixel shift is to the left or to the right.

27. A non-transitory computer readable storage medium comprising a computer program including a set of instructions executable by an electronic processor circuit, for producing a three dimensional image on a three dimensional display device, wherein the three dimensional display device comprises a three dimensional display that has a first surface, wherein the first surface emits light, the medium comprising:
- code for receiving a three dimensional video signal that comprises three dimensional video data and depth metadata indicative of depths of elements occurring in the three dimensional video data, which depth metadata is distinct from the video data and includes a near value indicative of a depth of one or more elements occurring in the three dimensional video data that extend most in a first direction normal to the first surface and away from the first surface toward a viewer when displayed on the three dimensional display,
- code for retrieving the three dimensional video data and depth metadata from the three dimensional video signal, and
- code for positioning at least one auxiliary data object at an auxiliary depth based on the retrieved depth metadata, wherein the auxiliary data is displayed in combination with the three dimensional video data.

28. The medium of claim 27, wherein if the auxiliary data is not received from another device, to provide the auxiliary data, wherein the auxiliary data includes at least one of subtitles, logos, or three dimensional image data.

29. The medium of claim 27, wherein the depth metadata is a list of offset values and an offset direction indicator, the offset values indicating a pixel shift between a left output plane and a right output plane of the auxiliary data and the direction indicator indicates whether the pixel shift is to the left or to the right.

* * * * *